(12) United States Patent
Sato

(10) Patent No.: US 8,760,686 B2
(45) Date of Patent: Jun. 24, 2014

(54) INFORMATION PROCESSING APPARATUS AND METHOD FOR TRANSFERRING SETTINGS INFORMATION

(75) Inventor: Tetsuya Sato, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 529 days.

(21) Appl. No.: 12/703,060

(22) Filed: Feb. 9, 2010

(65) Prior Publication Data

US 2010/0208295 A1    Aug. 19, 2010

(30) Foreign Application Priority Data

Feb. 18, 2009  (JP) ................................ 2009-035815

(51) Int. Cl.
*G06F 3/12*    (2006.01)

(52) U.S. Cl.
USPC ......... 358/1.15; 358/1.13; 717/174; 717/176; 717/168

(58) Field of Classification Search
USPC ................ 358/1.15, 1.13; 717/174, 176, 168
See application file for complete search history.

(56) References Cited

U.S. PATENT DOCUMENTS

| | | | |
|---|---|---|---|
| 7,827,277 B2* | 11/2010 | Kawai ........................... | 709/224 |
| 2005/0183141 A1* | 8/2005 | Sawada ........................... | 726/16 |
| 2005/0206950 A1* | 9/2005 | Ushiro et al. ................ | 358/1.15 |
| 2005/0219640 A1* | 10/2005 | Kasatani ....................... | 358/402 |
| 2006/0101456 A1* | 5/2006 | Crosier et al. ................ | 717/174 |
| 2006/0126111 A1* | 6/2006 | Song et al. .................... | 358/1.15 |
| 2007/0016902 A1 | 1/2007 | Shozaki et al. ............... | 717/174 |
| 2007/0195370 A1* | 8/2007 | Suga et al. .................... | 358/1.18 |
| 2009/0031252 A1* | 1/2009 | Toda .............................. | 715/826 |

FOREIGN PATENT DOCUMENTS

JP    2007-025906    2/2007

* cited by examiner

*Primary Examiner* — Jacky X Zheng
(74) *Attorney, Agent, or Firm* — Fitzpatrick, Cella, Harper & Scinto

(57) ABSTRACT

A situation can occur in which the seating location of a user is moved due to personnel changes within a division or the like, and the user has to use a different nearby image forming apparatus. In such a case, with conventional technology, it is not possible to efficiently transfer the settings information used in an image forming apparatus used before the personnel change to the new nearby image forming apparatus. According to the present invention, when an instruction to register an image forming apparatus is made in an application by the user, settings information set by the user is searched for in the image forming apparatuses that are registered in the application and the image forming apparatuses that were deleted from the application in the past, and they are presented as transfer candidates.

10 Claims, 14 Drawing Sheets

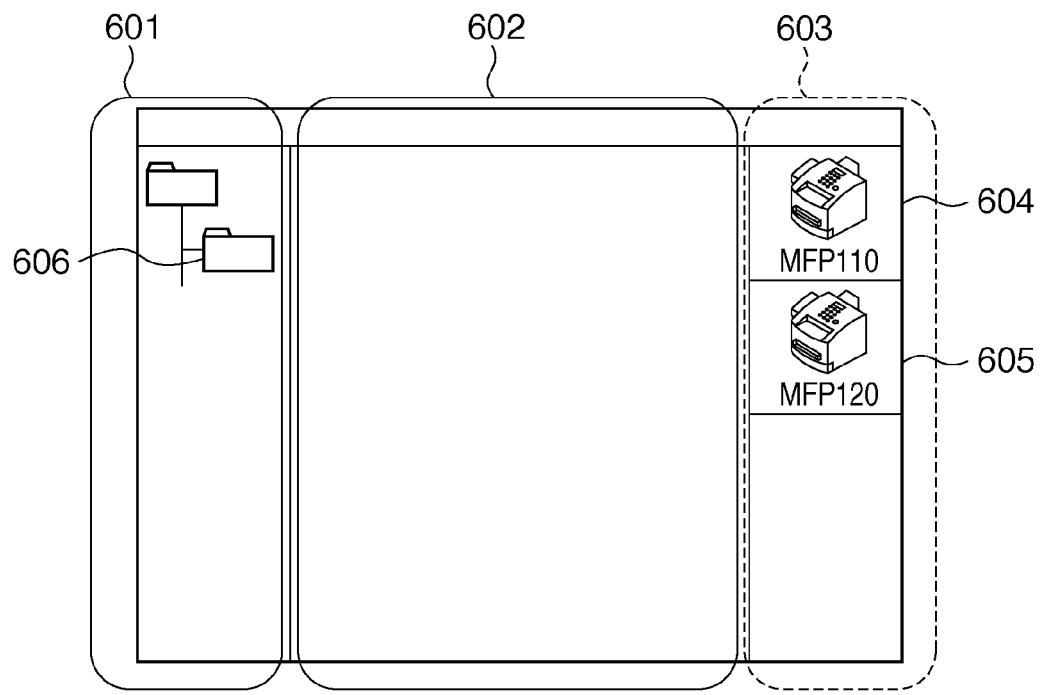

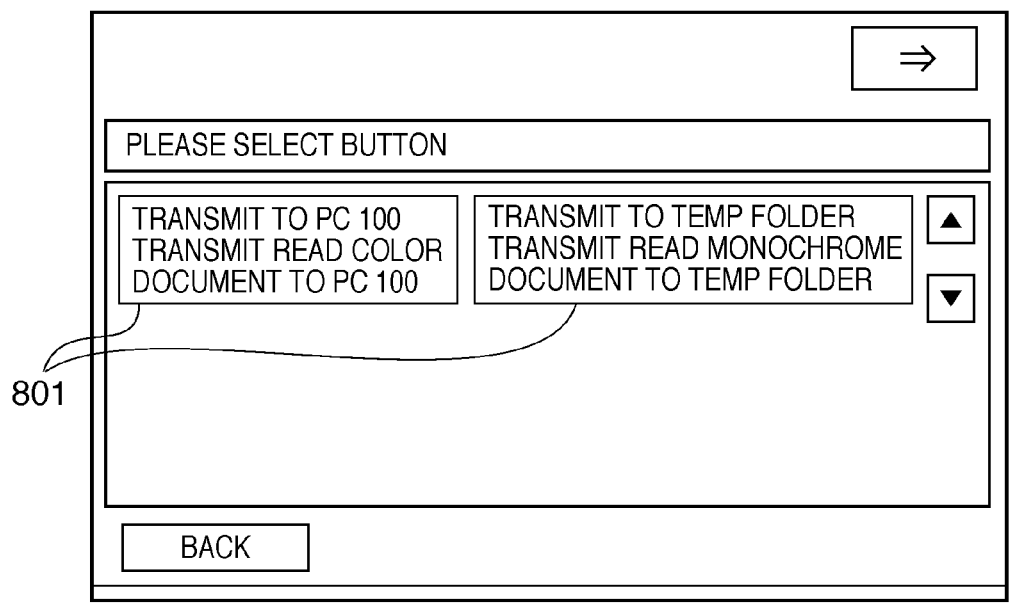

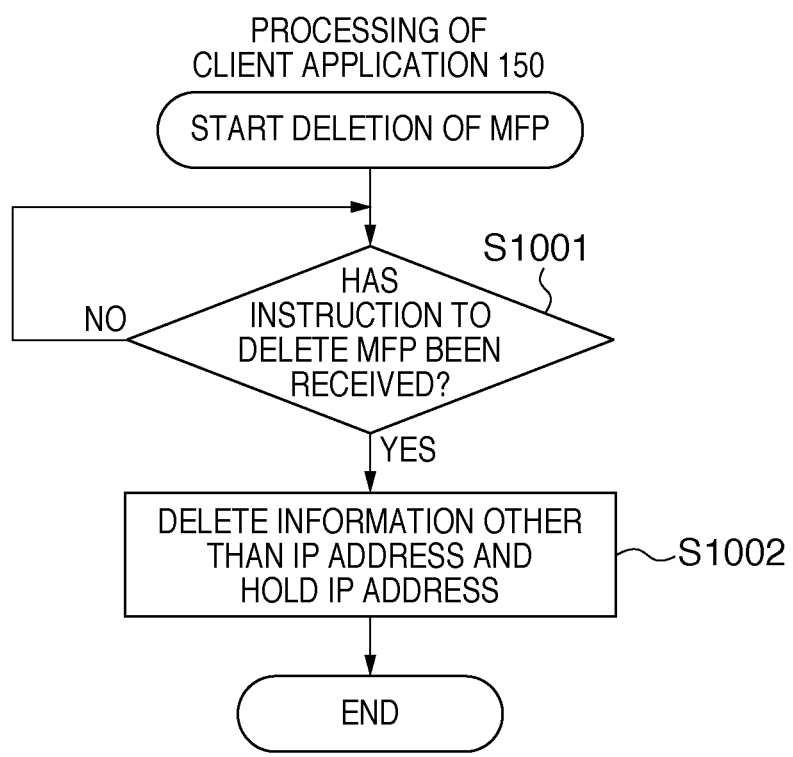

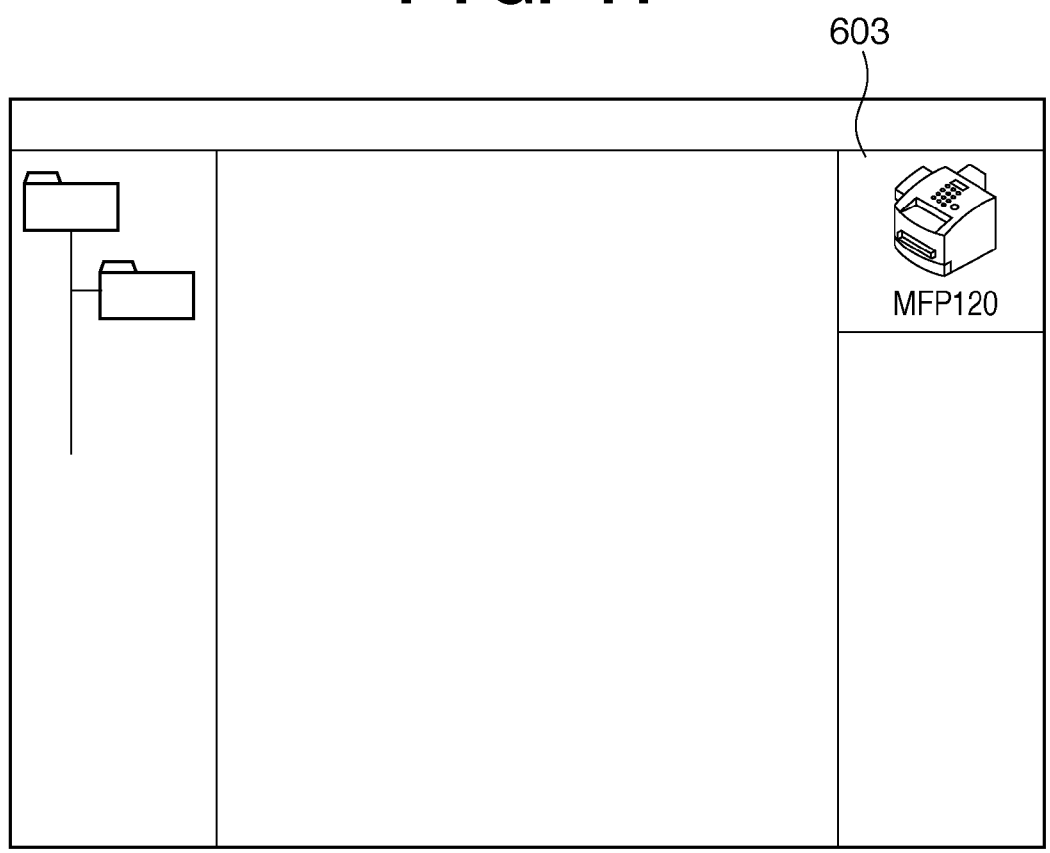

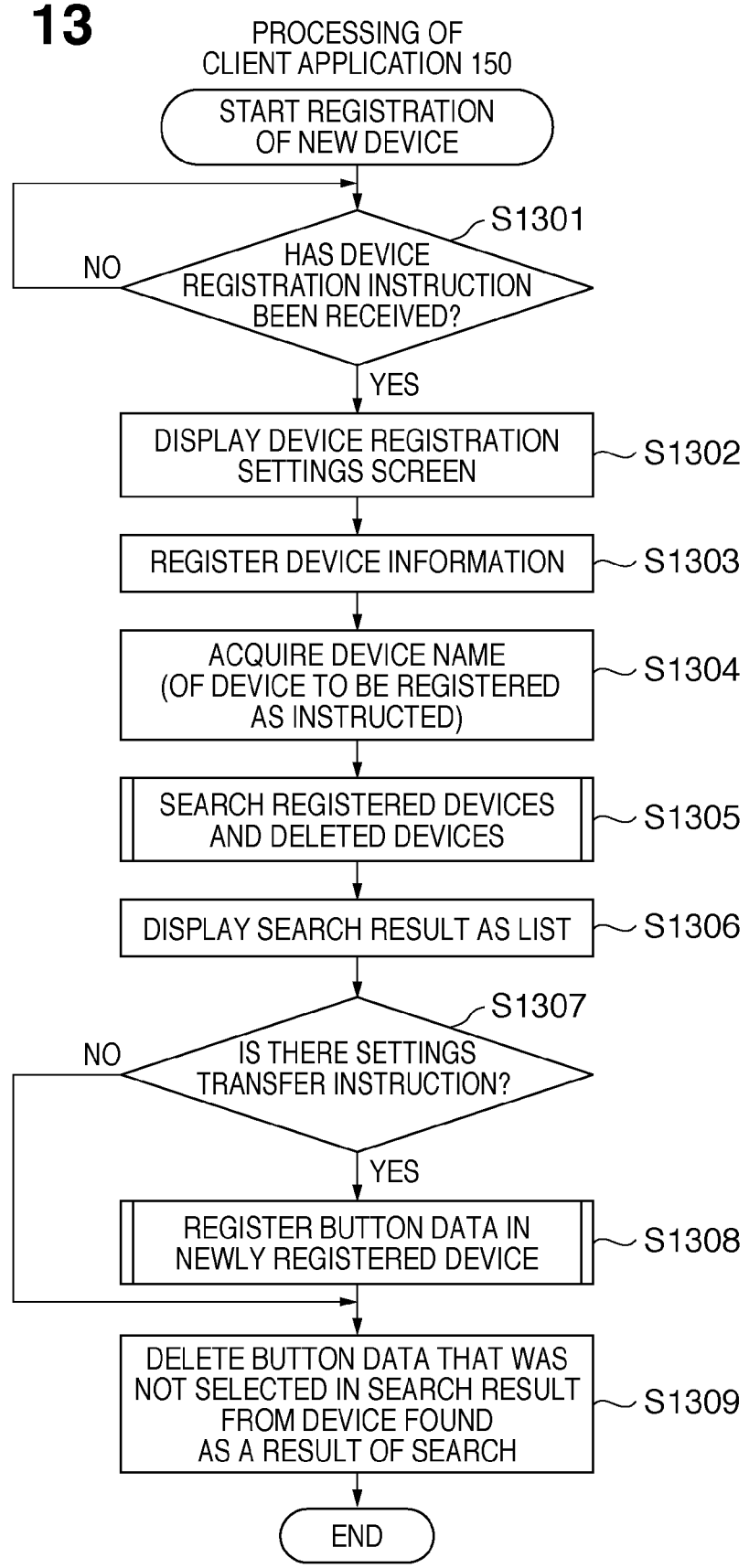

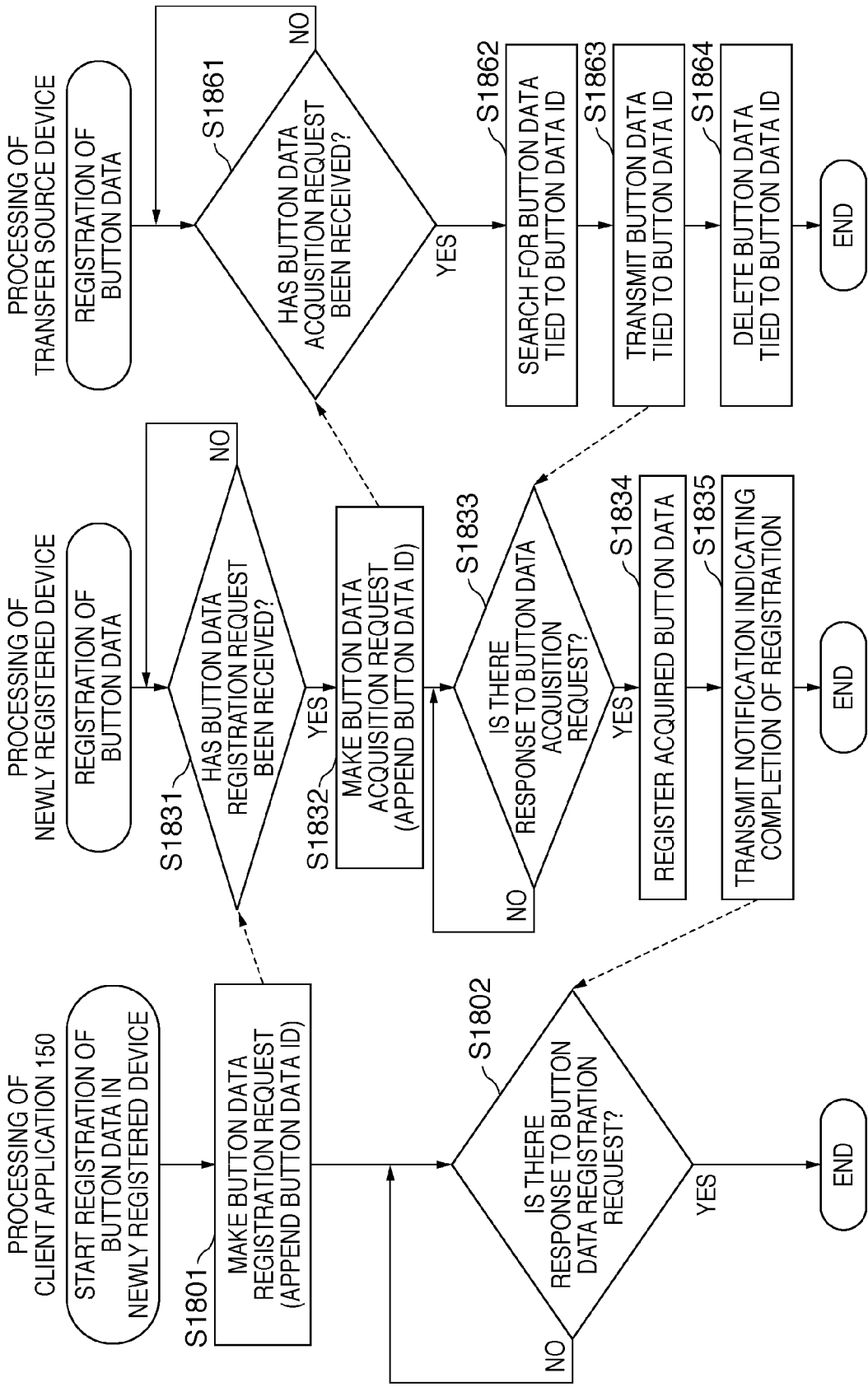

INFORMATION PROCESSING APPARATUS AND METHOD FOR TRANSFERRING SETTINGS INFORMATION

BACKGROUND OF THE INVENTION

1. Field of the Invention

The present invention relates to an information processing apparatus and method for transferring settings information registered in, for example, an image forming apparatus or the like to another image forming apparatus.

2. Description of the Related Art

In a conventional MFP (Multi Function Peripheral) that has a copy function, a print function and a facsimile transmission function and so on, macros that execute frequently used settings and a series of processes can be registered as buttons, whereby the user can perform a desired process with a simple operation, just pressing a button registered on a user interface of the MFP, without the need to set complicated settings each time. In addition, an application is also provided that is capable of creating button data with the use of a keyboard and a mouse of a PC (personal computer) and registering the button data in an MFP. Because of the use of a keyboard and a mouse, a high degree of ease of operation is ensured as compared to creating button data with the use of an UI (user interface), such as a touch panel, of an MFP.

Generally, MFPs are often used in a shared manner in companies or the like. In companies, a situation can occur in which the installation location of the PC of a user is sometimes changed due to personnel changes within a division or the like. In such a case, if the user is moved far away from an MFP the user was using before said personnel changes, the user has to use another nearby MFP. So, the user registers the nearby MFP in the PC. Under such circumstances, when the user wants to use the same settings as those within the MFP used before personnel changes, such as button data, in the newly registered MFP, or when the MFP used before personnel changes and the newly registered MFP have the same functions, it is very frustrating for the user to create new button data and register the button data in the newly registered MFP. In addition, if all of the settings registered in an MFP are saved in the PC for reuse, new settings created or edited on the MFP cannot be transferred.

Japanese Patent Laid-Open No. 2007-25906 describes a method for using settings of another application in a newly installed application. According to Japanese Patent Laid-Open No. 2007-25906, the same type of application as a newly installed application is searched for in the information processing apparatus in which the new application has been installed and in other information processing apparatuses connected to a network, and the settings of the same type of application found as a result of the search are used as initial settings in the newly installed application.

However, with the above-described conventional technique, the information processing apparatuses on the network to be searched are not narrowed down, so it is necessary to search all of the information processing apparatuses connected to the network. If a large number of information processing apparatuses are connected to the network, a long time is spent in searching. In addition, with the conventional technique, because the search targets are existing applications, it is not possible to use the settings of an application that was deleted by, for example, uninstallation in the new application.

SUMMARY OF THE INVENTION

In order to solve the above-described problems, the present invention has the following configuration. Specifically, the present invention relates to an information processing apparatus that is connected to a plurality of image forming apparatuses with a network, the apparatus including: a device information holder configured to hold device information that includes an identifier of an image forming apparatus that is registered or was registered as a usable apparatus; a search unit configured to search the network for an image forming apparatus that corresponds to the device information held by the device information holder; and a registration request unit configured to issue a registration request to register operational settings information, in which an operation of an image forming apparatus is defined, that is registered in the image forming apparatus found by the search unit to a new image forming apparatus registered as a usable apparatus by the information processing apparatus.

According to the present invention, the existing operational settings of an image forming apparatus can be carried over, as a result of which it is possible to reduce the operational burden and prevent erroneous settings. Furthermore, an image forming apparatus that has operational settings to be carried over is selected from among the image forming apparatuses that are currently used or that were used in the past, whereby it is possible to narrow down search target apparatuses. It is also possible to carry over operational settings from an apparatus that is currently not in use.

Further features of the present invention will become apparent from the following description of exemplary embodiments with reference to the attached drawings.

BRIEF DESCRIPTION OF THE DRAWINGS

FIG. 6 shows an example of a UI of a client application 150 of an information processing system according to an embodiment of the present invention.

FIG. 7 shows an example of data stored in the client application 150 of an information processing system according to an embodiment of the present invention.

FIG. 8 shows an example of a UI displayed on an operation unit 312 of an MFP 110 according to an embodiment of the present invention.

FIG. 9 shows an example of data stored in the MFP 110 according to an embodiment of the present invention.

FIG. 10 is a data processing procedure showing an overall flow of a process for deleting device information of an information processing system according to an embodiment of the present invention.

FIG. 11 shows an example of a UI of the client application 150 of an information processing system according to an embodiment of the present invention.

FIG. 12 shows an example of data stored in the client application 150 of an information processing system according to an embodiment of the present invention.

FIG. 13 is a data processing procedure showing an overall flow of a process for registering a new device of an information processing system according to an embodiment of the present invention.

FIG. 18 is a data processing procedure showing an overall flow of a process for registering button data of an information processing system according to Embodiment 2 of the present invention.

DESCRIPTION OF THE EMBODIMENTS

Embodiment 1

Hereinafter, best modes for carrying out the present invention will be described with reference to FIGS. 1 to 17.

System Configuration

Figure 1:
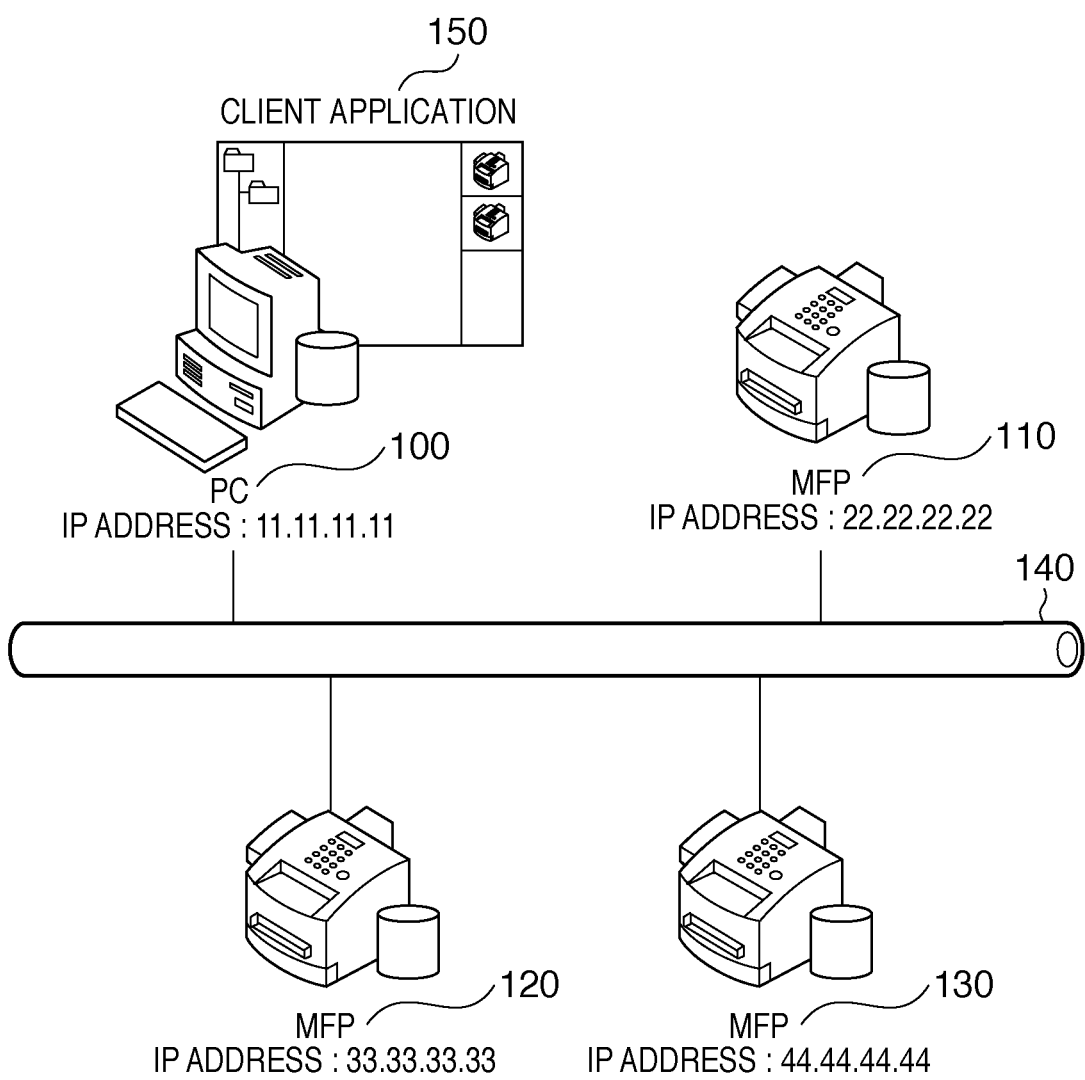
FIG. 1 is a conceptual diagram of a system to which an information processing system according to an embodiment of the present invention is applied.

FIG. 1 is a conceptual diagram of a system in which an information processing system according to the present embodiment is applied. A PC (corresponding to an information processing apparatus) 100 and MFPs (corresponding to image forming apparatuses) 110, 120 and 130 are connected to a network via a LAN 140. In the PC 100, a client application 150 dedicated to the image forming system of the present invention is installed. The PC 100, the MFP 110, the MFP 120 and the MFP 130 are assumed to have IP addresses "11.11.11.11", "22.22.22.22", "33.33.33.33" and "44.44.44.44", respectively. The IP addresses are used as identification information or identifiers of the apparatuses.

Hardware Configuration

Figure 2:
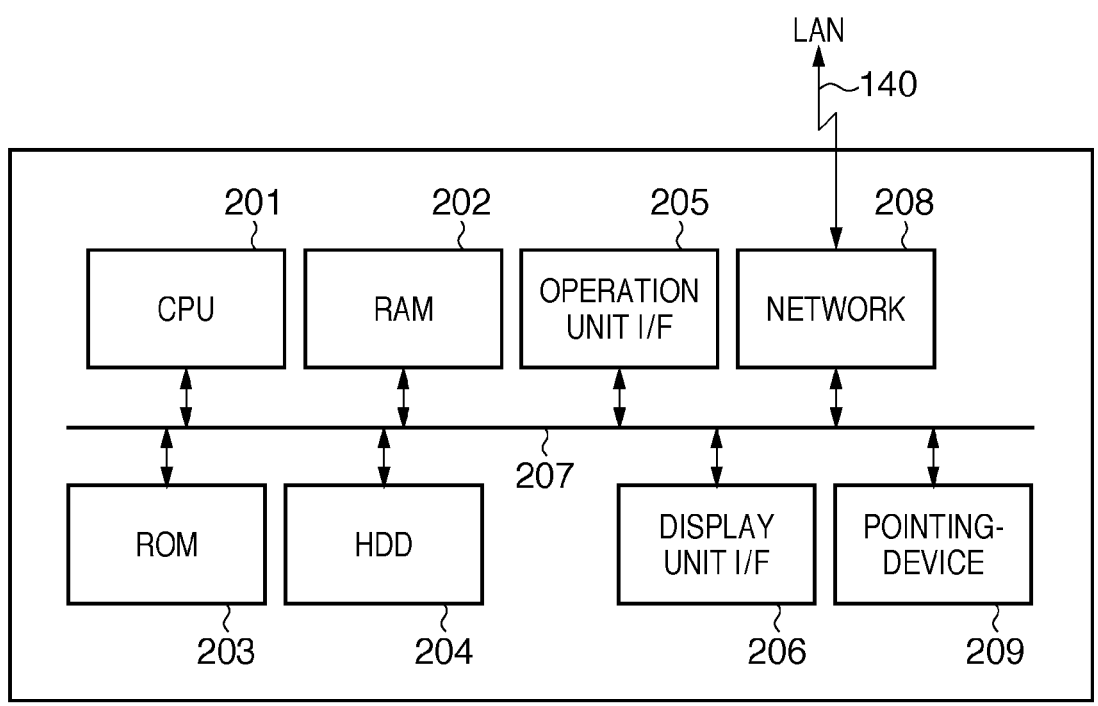
FIG. 2 is a hardware configuration diagram of a PC that constitutes the information processing system.

FIG. 2 is an example of a hardware configuration diagram of a PC that constitutes the information processing system according to the present embodiment. A CPU 201, a RAM 202, a ROM 203 and a hard disk drive (HDD) 204 are located on a system bus 207. In addition, an operation unit I/F (interface) 205 that is connected to a keyboard and the like, a display unit I/F 206 that is connected to a CRT and the like, a network interface 208 and a pointing device I/F 209 that is connected to a mouse and the like are also located on the system bus 207. A control program and an application program have been stored in advance in the ROM 203 or the HDD 204. The CPU 201 executes the control program and the application program by loading them from the ROM 203 or the HDD 204 onto the RAM 202 as necessary. The CPU 201 also displays a variety of information via the display unit I/F 206 and receives user instructions and the like via the operation unit I/F 205 and the pointing device I/F 209. The CPU 201 also performs communication with other apparatuses on the LAN 140 via the network interface 208.

Figure 3:
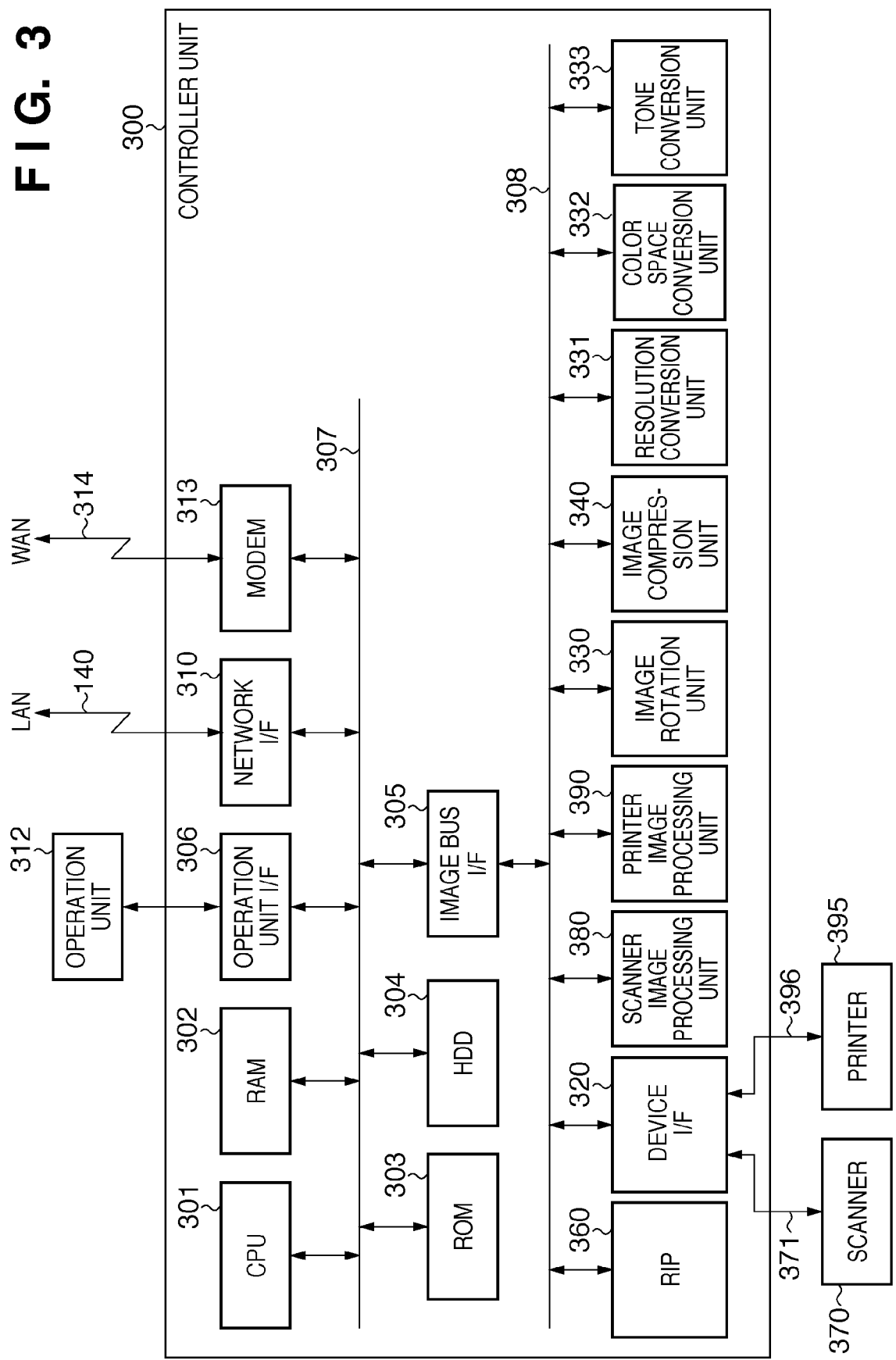
FIG. 3 is a hardware configuration diagram used to illustrate an internal configuration of each MFP that constitutes the information processing system according to an embodiment of the present invention.

FIG. 3 is an example of a hardware configuration diagram for illustrating an internal configuration of each MFP that constitutes the information processing system of the present embodiment. A controller unit 300 is connected to a scanner 370 as an image input device and a printer 395 as an image output device. The controller unit 300 is a controller that inputs and outputs image information and device information by establishing a connection with the LAN 140 or a public line (WAN) 314. A CPU 301 is a controller that controls the entire system. A RAM 302 is a system work memory for the CPU 301 to perform operations, and is also an image memory for temporarily storing image data. A ROM 303 is a boot ROM in which a system boot program is stored. A HDD 304 is a hard disk drive in which image data and software modules are stored. An operation unit I/F 306 is an interface unit with an operation unit (UI) 312, and outputs image data to be displayed on the operation unit 312 to the operation unit 312. A network interface 310 is connected to the LAN 140, and inputs and outputs information. A modem 313 is connected to the public line 314, and inputs and outputs image information. These devices are located on a system bus 307.

An image bus I/F 305 is a bus bridge that connects the system bus 307 and an image bus 308 for transferring image data at a high speed and converts data structures. The following devices are located on the image bus 308. A raster image processor (RIP) 360 expands PDL code into a bitmap image. A device I/F unit 320 connects the scanner 370 and the printer 395 that are image input and output devices to the controller 300. A scanner image processing unit 380 corrects, processes and edits input image data. The scanner image processing unit 380 also has a function of determining whether an input image is a color original or a monochrome original based on a chromatic signal of the image and holding the result.

A printer image processing unit 390 corrects, processes and edits output image data. An image rotation unit 330 is capable of reading an image from the scanner in cooperation with the scanner image processing unit, and rotating the image and storing it in a memory, or rotating an image stored in a memory and storing it in the memory, or printing out an image stored in a memory while rotating it in cooperation with the printer image processing unit. A resolution conversion unit 331 performs resolution conversion processing on an image stored in a memory and stores it in the memory. A color space conversion unit 332 converts, for example, a YUV image stored in a memory into a Lab image by a matrix operation, and stores the image in the memory. A tone conversion unit 333 converts, for example, an 8-bit, 256-grayscale image stored in a memory into a 1-bit, 2-grayscale image by a technique such as an error diffusion process, and stores the 1-bit, 2-grayscale image in the memory. An image compression unit 340 compresses and decompresses multi-valued image data into and from JPEG format, and compresses and decompresses binary image data into and from JBIG, MMR, MR or MH format. The image rotation unit 330, the resolution conversion unit 331, the color space conversion unit 332, the tone conversion unit 333 and the image compression unit 340 are capable of operating in conjunction with each other. For example, when performing image rotation and resolution conversion on an image stored in a memory, both processes can be executed without the involvement of the memory.

Software Configuration

Figure 4:
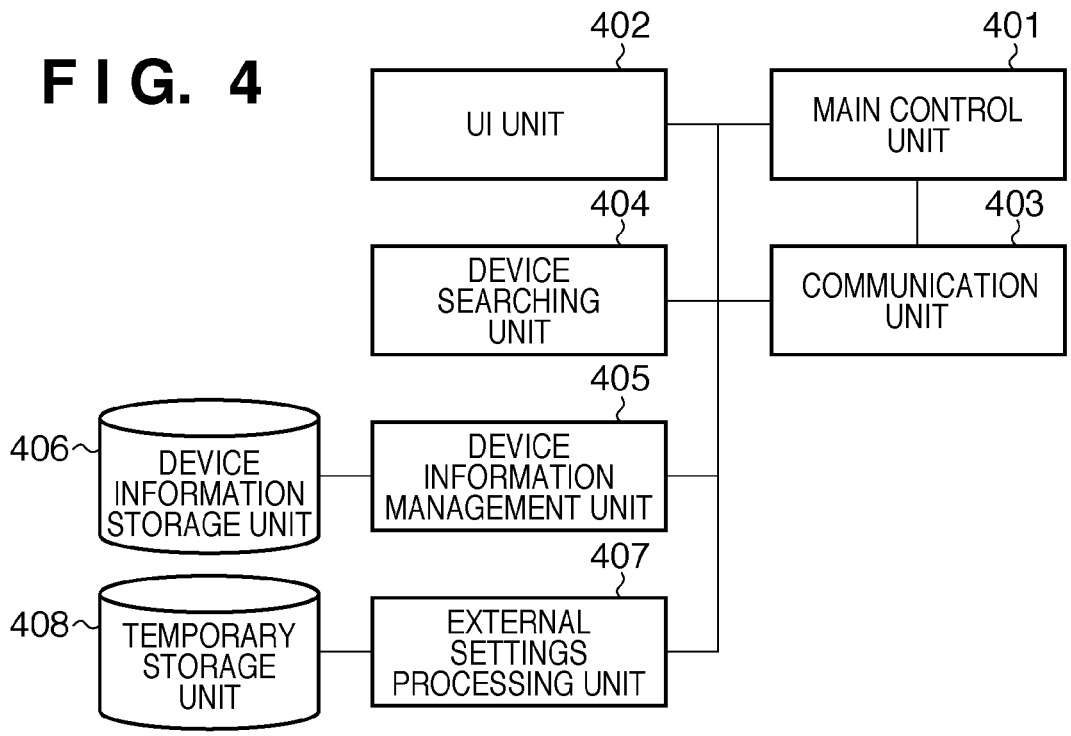
FIG. 4 is a software configuration diagram of a PC 100 of an information processing system according to an embodiment of the present invention.

FIG. 4 is an example of a software configuration diagram of the PC 100 of the information processing system according to the present embodiment. The software shown in FIG. 4 is stored on the HDD 204 of the PC 100, and is expanded before execution and executed by the CPU 201. A main control unit 401 is a software module that controls the client application 150 of the information processing system of the present embodiment and instructs and manages the following units. A UI unit 402 is a software module that performs display for the client application 150 via a display unit interface 206 in response to an instruction from the main control unit 401. The UI unit 402 receives an operation from the user through a mouse or keyboard, and notifies the main control unit 401 of the content of the operation. A communication unit 403 performs communication with external apparatuses that are connected with the LAN 140 such as information processing apparatuses and MFPs via the network interface 208 in response to instructions from the main control unit 401 and a device searching unit 404. The communication unit 403 also receives communication from an external apparatus connected with the LAN 140, and provides notifications to the main control unit 401 and the device searching unit 404. The device searching unit 404 is a software module that searches MFPs connected to the network in response to an instruction from the main control unit 401 and notifies the main control unit 401 of the result of search. A device information management unit 405 is a software module that registers, in a device information storage unit (or device information holding unit) 406, communication destination information, such as an IP address and a host name, and device information such as an icon of an MFP. The information registered here includes identification information and icon information regarding a device used by the personal computer 100, and so on. For example, necessary information may be input by the user in accordance with a prescribed registration procedure, or necessary information may be searched for in the network and registered as found or selected and registered. The device information management unit 405 also reads device information from the device information storage unit 406 in response to instructions from the main control unit 401 and the device searching unit 404. An external settings processing unit 407 is a software module that registers external settings, such as button data, which will be described later, in a temporary storage unit 408. The external settings processing unit 407 also creates and edits external settings in response to an instruction from the main control unit 401.

Figure 5:
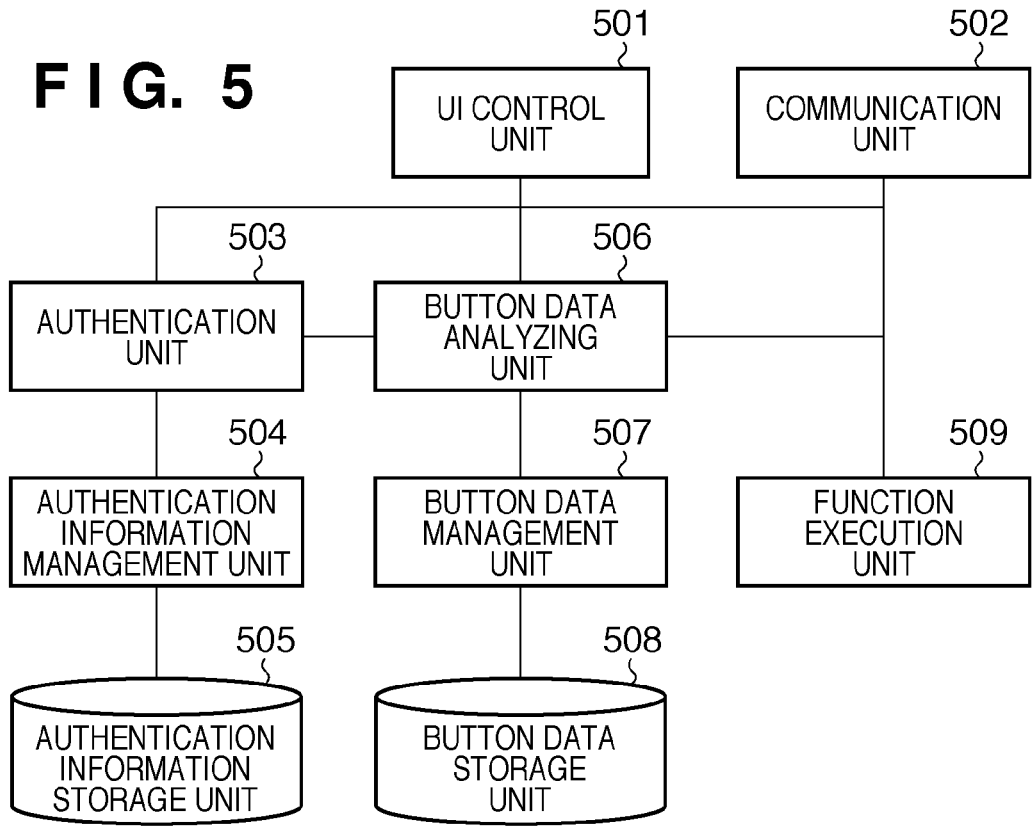
FIG. 5 is a software configuration diagram of an MFP of an information processing system according to an embodiment of the present invention.

FIG. 5 is an example of a software configuration diagram of each MFP of the information processing system of the present embodiment. The software shown in FIG. 5 is stored on the HDD 304, and is expanded onto a memory before execution and executed by the CPU 301. A UI control unit 501 is a software module that displays on the operation unit 312 via the operation unit I/F 306, or processes user's input from the operation unit 312. A communication unit 502 is a software module that operates the network interface 310 and the modem 313 so as to perform communication. An authentication unit 503 is a software module that receives login information regarding an operating user from the UI control unit 501 and user information from the communication unit, performs user authentication and manages user sessions. An authentication information management unit 504 is a software module that manages authentication information for users registered in an authentication information storage unit 505 and responds to authentication information inquiries from the authentication unit 503. In this example, each MFP incorporates an authentication information storage unit 505 and possesses authentication information, but it is also possible to employ a configuration in which authentication information is managed by an authentication server (not shown) provided separately. A button data analyzing unit 506 is a software module that analyzes button data. A button data management unit 507 is a software module that registers button data in a button data storage unit 508 in response to an instruction from the button data analyzing unit 506. The button data management unit 507 also reads button data from the button data storage unit 508 in response to an instruction from the button data analyzing unit 506. A function execution unit 509 is a software module for executing functions such as a scan function and a transmission function in accordance with data received from the button data analyzing unit 506 and the UI control unit 501.

As used herein, button data refers to data regarding a function of the MFP that has been associated with a single button defined on a user interface, for example. By associating a plurality of functions (processes) and parameters (processing parameters) with a button and registering it, for example, by the button being pressed, the associated processes are executed with the use of the associated processing parameters.

FIG. 6 is an example of a UI of the client application 150 of the information processing system of the present embodiment. The UI shown in FIG. 6 is displayed by the UI unit 402 via the display unit interface 206. The UI is configured with a tree view region 601 in which folders and directories are displayed in tree structures, an edit region 602 in which detailed settings are made for a process such as a scan process or a transmission process and button data is created, and a device display region 603 in which icons that represent devices such as an MFP and a scanner. The devices displayed in the device display region 603 have been registered in the client application, and information on such devices has been stored in the device information storage unit 406. For example, in FIG. 6, the MFP 110 and the MFP 120 have been registered in the client application. By performing an operation on a device icon displayed in the device display region 603, a process request can be made to the device icon. For example, by dragging and dropping a document file located in the edit region onto a device icon, it is possible to make a print process request. Also, by dragging and dropping an icon displayed in the device display region 603 onto a folder icon 606 of the tree view region 601, it is possible to register a scan transmission button addressed to the folder in the MFP, whereby it is possible to simultaneously perform a setting operation of a transmission destination and a registration operation of button data in the MFP. In the present embodiment, the setting operation of a transmission destination and the registration operation of button data in the MFP are performed by drag-and-drop, but it is also possible to set a transmission destination in the edit region 602 through an operation of a keyboard and a mouse and register it in the MFP. The user creates button data and registers the button data in the MFP by operating the UI of the client application shown in FIG. 6.

FIG. 7 is an example of data stored in the device information storage unit 406 of the client application 150 of the information processing system of the present embodiment. A column 701 shows a device name. In a column 702, a device IP address is stored, which serves as an identifier for a device when performing communication such as registering button data in the MFP. In the present embodiment, IP addresses are stored, but host names or the like may be stored if an environment allows name resolution by using DNS (Domain Name System). A column 703 shows icon data that is displayed in the device display region 603 of the UI of the client application. Other than the above, information regarding a device, such as the installation location of a device, may be stored. In the present embodiment, a table format is used as a schematic diagram, but the data may be stored in a text file such as CSV (Comma Separated Values) format or XML (Extensible Markup Language).

FIG. 8 is an example of a UI displayed in the operation unit 312 of the MFP 110 of the present embodiment. FIG. 8 is a UI of the MFP 110 that is displayed after login. A description of a login screen UI is omitted. Upon receiving input information in a login screen from the user, the UI unit passes input information to the authentication unit 503. The authentication unit 503 determines whether there is authentication information that matches the input information for authentication. If authentication succeeds, the UI control unit 501 displays only buttons of the user identified by the authentication information on the UI. Buttons 801 are buttons for scan transmission that have been registered by the user from the PC 100 via the client application 150. Upon pressing the button, the MFP 110 executes scan transmission.

FIG. 9 is an example schematically showing a file stored in the button data storage unit 508 of the MFP 110 of the present embodiment. In the present embodiment, a table format is used as a schematic diagram, but a text file format such as CSV format or XML may be used. A column 901 shows a button data representation. A column 902 shows information that indicates which users are granted access rights to which button data. For example, for button data with an ID of 1, access rights for execution are granted to a user who has logged in with a user ID "1000", and a button for the button data is displayed when logged in using the user ID "1000". FIG. 8 is a UI displayed when logged in with the user ID "1000". Columns 903 to 905 show settings for scan transmission. The column 903 shows whether scanning is performed in color or monochrome. The column 904 shows the identifiers of PCs as transmission destinations. In the present embodiment, IP addresses are stored, but host names or the like may be stored if an environment allows name resolution by using DNS (Domain Name System). The column 905 shows paths to transmission destination folders. Other than the settings mentioned in the present embodiment, detailed settings, such as scan resolution and a file format for transmission, may be set. As described above, in the button data of this example, button identification information and associated processing parameters are stored. It is of course possible that identification information that indicates a process (function) is associated.

Process for Deleting Device

The data processing of the client application 150 when the user deletes a device on the client application 150 will be described with reference to FIGS. 10 to 12. The process for deleting device information registered in the client application 150 of the information processing system of the present embodiment will be described with reference to FIGS. 10 to 12.

FIG. 10 is a procedure of data processing of the client application performed so as to delete device information registered in the client application 150 of the information processing system of the present embodiment. In S1001, the UI unit 402 monitors whether or not an instruction to delete device information has been received from the user. If a deletion instruction is detected, the UI unit 402 makes a request to delete the device information to be deleted as instructed to the main control unit 401, and the processing proceeds to S1002. The UI unit 402 continues monitoring of a deletion instruction. In S1002, upon receiving an instruction from the main control unit 401, the device information management unit 405 deletes the device information as instructed. At this point in time, the device information management unit 405 reads device information from the device information storage unit 406, deletes the device information except for the IP address, and ends the process.

A UI displayed after the MFP 110 registered in the client application 150 has been deleted and the data stored in the device information storage unit 406 are shown in FIGS. 11 and 12. As shown in FIG. 11, because the device information regarding the MFP 110 has been deleted, the icon representing the MFP 110 is not displayed in the device display region 603, from which it can be seen that the user cannot make a process request to the MFP 110 by operating a device icon. Also, as shown in FIG. 12, only the IP address is held in the column 702 as information regarding the MFP 110.

Process for Registering New Device

The data processing of the client application 150 and an MFP when the user registers it as a new device on the client application 150 will be described with reference to FIGS. 13 to 17.

FIG. 13 is a procedure of data processing of the client application 150 performed so as to register a new device in the client application 150 of the information processing system of the present embodiment. In S1301, the UI unit 402 monitors whether or not an instruction to register a device has been received from the user. If a registration instruction is detected, the processing proceeds to S1302. If a registration instruction is not detected, the UI unit 402 continues monitoring. In S1302, the UI unit 402 displays a device information settings screen, and the processing proceeds to S1303. The device information settings screen is not shown here, but is a screen in which a device name, an IP address and the like are input. In S1303, the main control unit 401 instructs the device information management unit 405 to register the content input in the device information settings screen. The device information management unit 405 saves the device information to be registered as instructed in the device information storage unit 406. In S1304, the main control unit 401 instructs the communication unit 403 to acquire a device name from the device to be registered as instructed. The communication unit 403 acquires a device name from the device, and the processing proceeds to S1305. In the present embodiment, a device name is acquired as an identifier for identifying a device function, but it is also possible to use an identifier that can identify a device function such as monochrome or color. It is also possible to employ a configuration in which a function template file or the like is created on the device side and the function template file is acquired. In S1305, the main control unit 401 passes the acquired device name to the device searching unit 404 and searches for a device that has the same device name, and the processing proceeds to S1306. The targets of search are only the devices registered in the client application 150 and the devices that were deleted from the client application 150 in the past (or in other words, the devices that were registered), rather than the entire network. In the case of the present embodiment, the MFP 110 that was deleted from the client application 150, and the MFP 120 that is registered in the client application 150 are search targets, and search is not performed for other devices. The device search process will be described later in detail with reference to FIG. 14.

In S1306, the UI unit 402 displays the search result in the form of a list. In the search result list, the button data of a device whose device name is the same as that of the registered device is displayed. A search result list screen will be described later with reference to FIG. 15. In S1307, the UI unit 402 determines whether the user has given an instruction to transfer the settings of the button data. If an instruction to transfer the settings is detected, the processing proceeds to S1308. If an instruction to transfer the settings is not detected, the processing proceeds to S1309. In S1308, in response to an instruction from the main control unit 401, the external settings processing unit 407 registers the button data to be transferred as instructed in the newly registered device, and the processing proceeds to S1309. A process for registering button data will be described later in detail with reference to FIG.

17. In S1309, the main control unit 401 instructs the external settings processing unit 407 to delete the button data within the device found as a result of search in S1305. The external settings processing unit 407 transmits a request to delete the button data within the device as instructed to the device via the communication unit 403.

Figure 14:
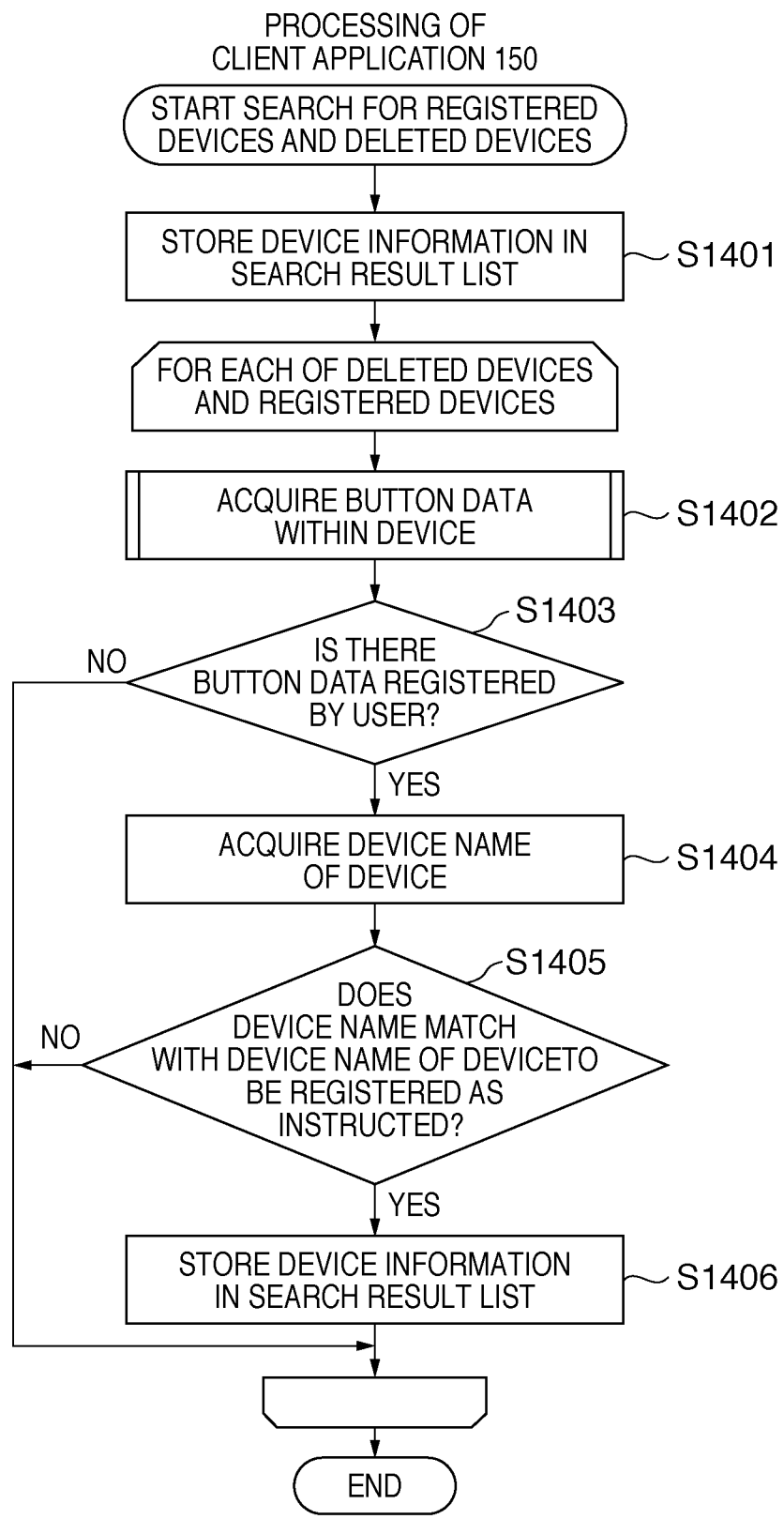
FIG. 14 is a data processing procedure showing an overall flow of a process for searching for a device of an information processing system according to an embodiment of the present invention.

FIG. 14 is a procedure of data processing of the client application 150 performed when searching for a device in the information processing system of the present embodiment. FIG. 14 is a detailed procedure of data processing of S1305 of FIG. 13. In S1401, in response to an instruction from the device searching unit 404, the device information management unit 405 reads the IP addresses of the devices that are registered in the client application 150 and the devices that were deleted therefrom in the past from the device information storage unit 406. The read IP addresses are passed to the device searching unit 404. The procedure spanning from S1402 to S1406 is repeated for each of the devices identified by the read IP addresses. Search is not performed for the IP addresses that are not stored in the device information storage unit 406.

In S1402, in response to an instruction from the device searching unit 404, the external settings processing unit 407 acquires button data within the device. At this point in time, the device searching unit 404 passes the IP address of the device acquired in S1401 to the external settings processing unit 407. The external settings processing unit 407 acquires button data within the device identified by the IP address received from the device searching unit 404 and the user ID via the communication unit 403. At this point in time, the external settings processing unit 407 saves the acquired button data in the temporary storage unit 408. A process for acquiring button data will be described later in detail with reference to FIG. 16.

In S1403, the device searching unit 404 checks whether there is button data that is tied to the acquired user ID. If button data tied to the user ID is found, the processing proceeds to S1404. If button data tied to the user ID is not found, the processing proceeds to the end of the loop. In the present embodiment, because only button data that is tied to the user ID within the device is acquired in S1402, if one piece of data is acquired, it means that there is button data tied to the user ID.

In S1404, in response to an instruction from the device searching unit 404, the communication unit 403 acquires the device name of the device, and the processing proceeds to S1405. In the present embodiment, a device name is acquired as an identifier for identifying a device function, but it is also possible to use an identifier that can identify a device function such as monochrome or color. It is also possible to employ a configuration in which a function template file or the like is created on the device side and the function template file is acquired.

In S1405, the device searching unit 404 checks whether the device name of the device as a search target acquired in S1404 matches with that of the newly registered device acquired in S1304. If they match, the processing proceeds to S1406. If they do not match, the processing proceeds to the end of the loop.

In S1406, the device searching unit 404 stores the IP address and button data of the device found in S1405 as a search result list. The read IP addresses are passed to the device searching unit 404. The procedure spanning from S1402 to S1406 is repeated until search for the devices identified by the read IP addresses ends.

Figure 15:
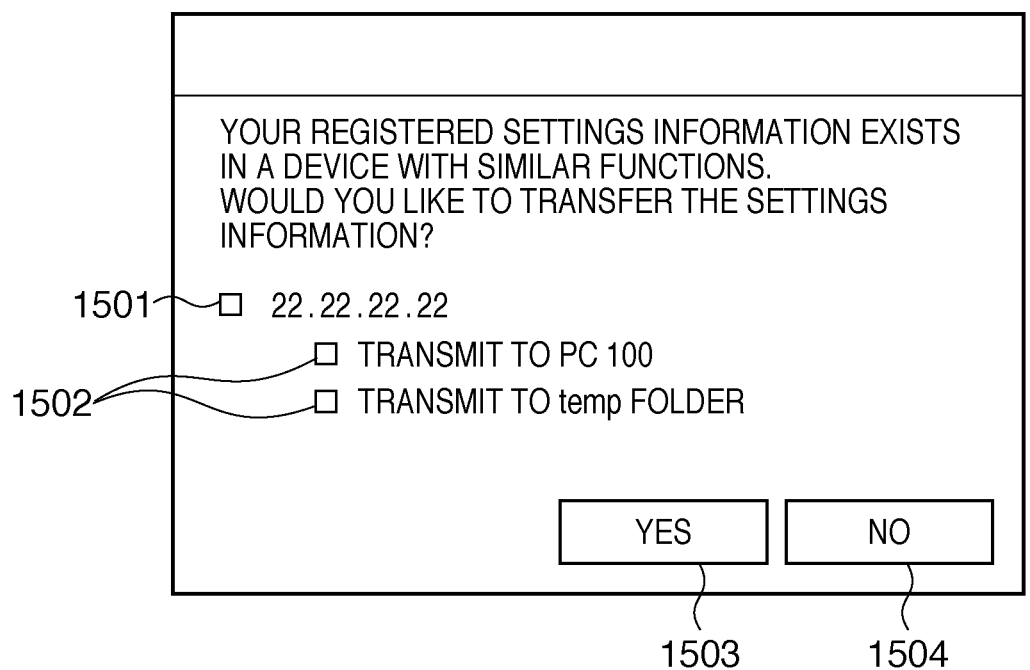
FIG. 15 shows an example of a UI for displaying a search result list of the client application 150 of an information processing system according to an embodiment of the present invention.

FIG. 15 is an example of a UI for displaying a search result list of the client application 150 of the information processing system of the present embodiment. This UI is displayed by the UI unit 402 via the operation unit I/F 205 in S1306 of FIG. 13. Reference numeral 1501 is a check box for selecting a device found as a result of search. When the check box 1501 is checked, a transfer target can be selected from the button data of the checked device. Reference 1502 is button data tied to the user ID located within a device found as a result of search. By checking a box, each button data can be selected as a transfer target. Reference numeral 1503 is a button for instructing the commencement of transfer. The user can issue a transfer instruction in S1307 by pressing the button 1503. Reference numeral 1504 is a button for instructing not to transfer. By pressing the button 1504, the user can choose not to perform transfer in S1307. That is, FIG. 15 is a UI displayed when the MFP 110 is found as a result of search, and the button data of the user whose user ID is 1000 has been acquired. In the present embodiment, only one device is displayed as an example, but it is of course possible to display a plurality of devices if a plurality of devices are found as a result of search.

Figure 16:
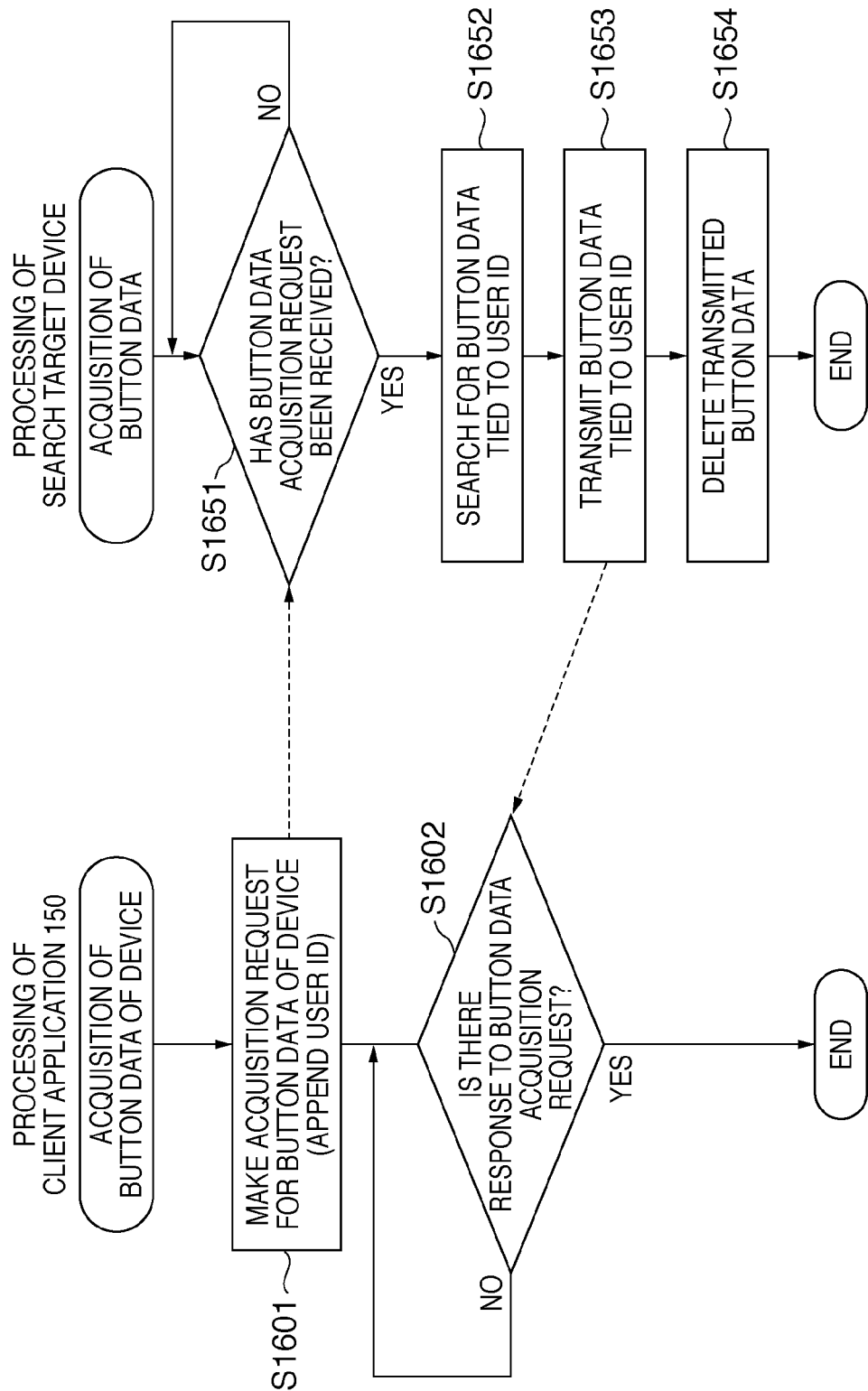
FIG. 16 is a data processing procedure showing an overall flow of a process for acquiring button data from a device as a search target of an information processing system according to an embodiment of the present invention.

FIG. 16 is a procedure of data processing of the client application 150 and a search target device performed so as to acquire button data in the information processing system of the present embodiment. FIG. 16 is a detailed procedure of data processing of S1402. In the present embodiment, the MFP 110 and the MFP 120 are search targets.

In S1601, the external settings processing unit 407 makes an acquisition request for button data to a device identified by the IP address received from the main control unit 401 via the communication unit 403. At this point in time, the user ID is appended to the button data acquisition request.

In S1602, the communication unit 403 monitors a response to the button data acquisition request from the device. If there is a response from the device, the communication unit 403 issues a notification to the external settings processing unit 407. The external settings processing unit 407 saves the acquired button data in the temporary storage unit 408. If there is no response from the device, the communication unit 403 continues monitoring.

In S1651, the communication unit 502 monitors an acquisition request for button data. If a button data acquisition request is detected, the communication unit 502 passes the acquisition request to the button data analyzing unit 506, and the processing proceeds to S1652. If a button data acquisition request is not detected, the communication unit 502 continues monitoring.

In S1652, in response to an instruction from the button data analyzing unit 506, the button data management unit 507 searches for button data tied to the user ID appended to the acquisition request. This button data search is performed in the data saved in the button data storage unit 508. The button data management unit 507 passes button data found as a result of search to the button data analyzing unit 506, and the processing proceeds to S1653. In the present embodiment, if it is assumed that the device that has received the acquisition request is the MFP 110 and the user ID appended to the acquisition request is 1000, button data that corresponds to the user 1000 in the column 902 of FIG. 9 is found, namely, a button with an ID of 1 and a button with an ID of 2 are found.

In S1653, in response to an instruction from the button data analyzing unit 506, the communication unit 502 transmits the button data found in S1652 to the client application 150. In S1654, the button data management unit 507 deletes the button data saved in the button data storage unit 508. The button data deleted here is the button data that has been transmitted to the client application 150 in S1653.

Figure 17:
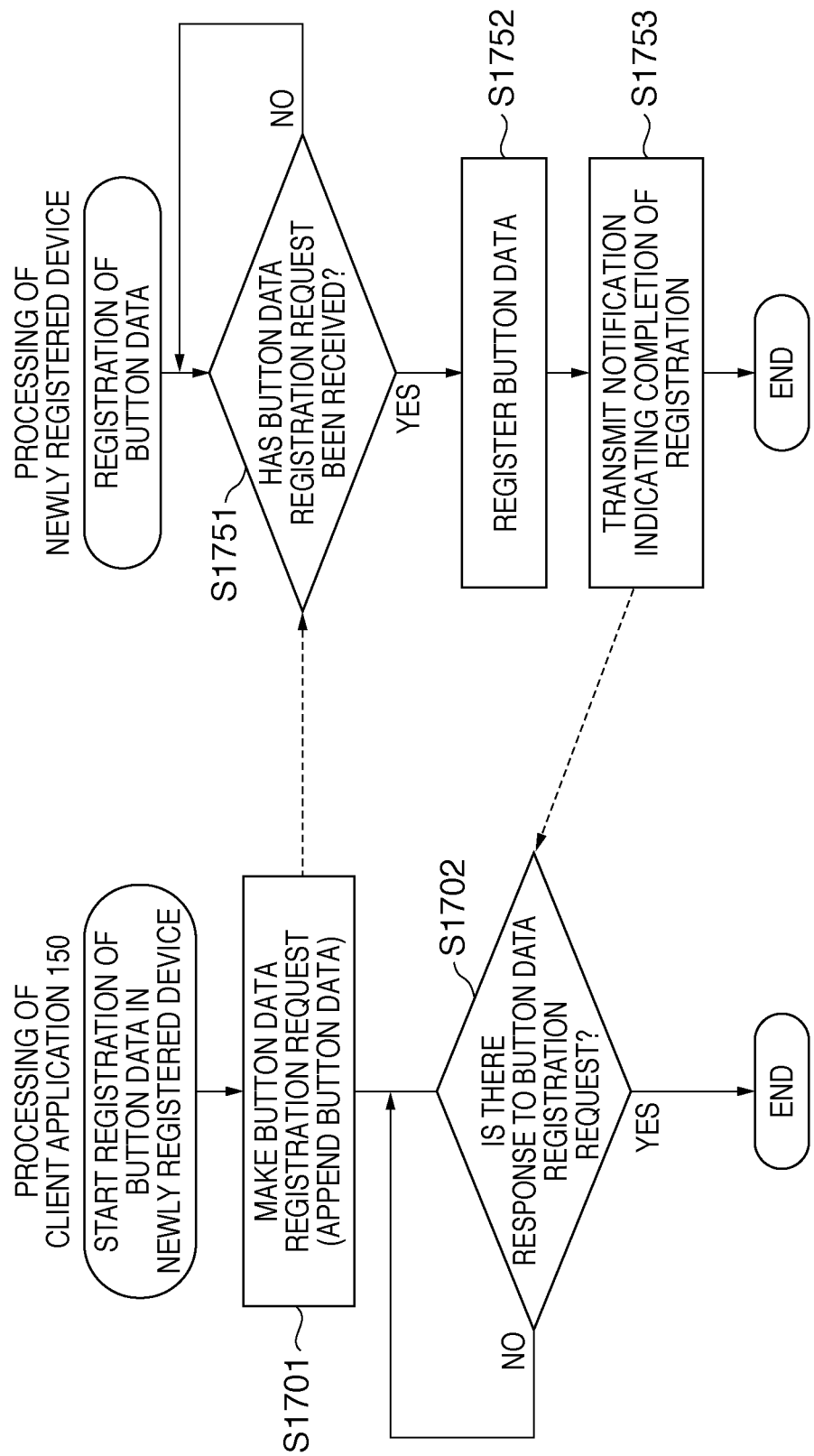
FIG. 17 is a data processing procedure showing an overall flow of a process for registering button data of an information processing system according to Embodiment 1 of the present invention.

FIG. 17 is a procedure of data processing of the client application 150 and a newly registered device performed so as to register button data in the information processing system of the present embodiment. FIG. 17 is a detailed procedure of data processing of S1308 of FIG. 13. In S1701, the external settings processing unit 407 makes a request to register button data to be transferred as instructed via the communication unit 403. That is, the external settings processing unit 407 issues a registration request. At this point in time, the external settings processing unit 407 reads the button data saved in the temporary storage unit 408, and passes a button data registration request and the button data to be transferred as instructed to the communication unit 403. The communication unit 403 appends the button data to the button data registration request and transmits the request to the device.

In S1702, the communication unit 403 monitors a response to the button data registration request from the device. If there is a response from the device, the process ends. If there is no response, the communication unit 403 continues monitoring. In S1751, the communication unit 502 monitors a button data registration request. If a button data registration request is detected, the communication unit 502 passes the registration request to the button data analyzing unit 506, and the processing proceeds to S1752. If a button data registration request is not detected, the communication unit 502 continues monitoring. In S1752, in response to an instruction from the button data analyzing unit 506, the button data management unit 507 saves the button data appended to the button data registration request in the button data storage unit 508, and the processing proceeds to S1753. In S1753, in response to an instruction from the button data analyzing unit, the communication unit 502 transmits a notification indicating completion of registration to the client application 150.

As described above, in Embodiment 1, only the devices that are registered in the client application 150 and the devices that were deleted in the past are used as search targets, whereby it is possible to transfer button data from a device that was deleted from the client application 150 in the past, as well as narrowing down search target devices that may serve as a button data transfer source. In addition, in the present embodiment, when transferring button data, the client application 150 acquires button data from a device and transfers the button data to a newly registered device, whereby it is possible to transfer button data created and edited on the device.

Variations

In the present embodiment, the information processing apparatus 100 includes a list display means that displays settings information for image forming apparatuses in the form of a list and a settings information selecting means that selects settings information for an image forming apparatus from the displayed settings information list in response to an instruction from the user. The information processing apparatus 100 causes a newly registered image forming apparatus to register the selected settings information.

According to this variation, the information processing apparatus 100 further acquires performance of an image forming apparatus that is registered in the device information storage unit 406 and that was registered or is registered as a usable image forming apparatus by a performance acquiring means. Targets for acquisition are MFPs (image forming apparatuses) that were or are registered in the information processing apparatus 100 as usable devices. The performance acquiring means can be implemented by the external settings processing unit 407 of the information processing apparatus. The performance is indicated by, for example, pre-registered performance information, and can be held in an MIB if the devices are SNMP compatible. The performance information registered in the MIB can be acquired by the SNMP manager of the information processing apparatus, with the image forming apparatuses as SNMP agents. As used herein, performance information refers to information that indicates processing performance and functions, such as for example, the number of printed sheets per unit time and the resolution, or the number of scanned sheets per unit time and the resolution of the scanner. Other examples include a color/monochrome function, the presence or absence of a box function for storing data, and so on. The external settings processing unit 407 of the information processing apparatus compares the performance of image forming apparatuses indicated by the acquired performance information, acquires button data, or in other words, operational settings information from an image forming apparatus with the highest performance, and transmits the operational settings information to a newly registered image forming apparatus so as to cause that image forming apparatus to register the operational settings information.

With this configuration, it is possible to omit an operation that allows the user to select one image forming apparatus from among a plurality of image forming apparatuses. In addition, it is expected that a device with the highest performance is used most frequently and many operational settings (or in other words, button settings) are set. The performance used for comparison may be a predetermined item. In this case, if there are a plurality of devices that have the same highest performance, one device is determined by using another criterion, for example, by comparing the magnitudes of IP addresses or another performance item. It is also possible to evaluate comprehensively by, for example, weighing and then summing a plurality of performance index values.

Embodiment 2

Embodiment 2 of the present invention will be described with reference to FIG. 18. Embodiment 2 differs from Embodiment 1 in the process for registering button data. In Embodiment 1, when registering button data, the button data is appended to a button data registration request and then transmitted. In Embodiment 2, a button data ID and the IP address of a transfer source device are appended to a registration request, and button data is transferred between devices. Other configurations are the same as Embodiment 1, so a description there of is omitted here.

FIG. 18 is a procedure of data processing of the client application 150, a newly registered device and a transfer source device performed so as to register button data in an information processing system of the present embodiment.

In S1801, the external settings processing unit 407 makes a request to register button data to be transferred as instructed via the communication unit 403. The external settings processing unit 407 passes a button data registration request and the ID of the button data to be transferred as instructed to the communication unit 403. The communication unit 403 appends the button data ID and the IP address of a transfer source device to the button data registration request, and transmits the button data registration request to a newly registered device. In S1802, the communication unit 403 monitors a response to the button data registration request from the newly registered device. If there is a response from the newly registered device, the process ends. If there is no response, the communication unit 403 continues monitoring.

In S1831, the communication unit 502 monitors a button data registration request. If a button data registration request is detected, the communication unit 502 passes the registration request to the button data analyzing unit 506, and the processing proceeds to S1832. If a button data registration request is not detected, the communication unit 502 continues monitoring. In S1832, the communication unit 502 makes a button data acquisition request to a device identified by the IP address appended to the button data registration request, and the processing proceeds to S1833. Here, the button data ID appended to the button data registration request is appended to the button data acquisition request. In S1833, the communication unit 502 monitors a response to the button data acquisition request. If there is a response from the transfer source device, the communication unit 502 transmits a notification to the button data analyzing unit 506. If there is no response from the transfer source device, the communication unit 502 continues monitoring. In S1834, in response to an instruction from the button data analyzing unit 506, the button data management unit 507 saves button data appended to the response from the transfer source device in the button data storage unit 508. In S1835, the communication unit 502 transmits a notification indicating completion of button data registration to the client application 150.

In S1861, the communication unit 502 monitors a button data acquisition request. If a button data acquisition request is detected, the communication unit 502 passes the acquisition request to the button data analyzing unit 506, and the processing proceeds to S1862. If a button data acquisition request is not detected, the communication unit 502 continues monitoring. In S1862, in response to an instruction from the button data analyzing unit 506, the button data management unit 507 searches for button data tied to the button ID appended to the acquisition request. In the present embodiment, a button data ID is represented by an integer for the sake of simplicity, but in fact, it is desirable to use an identifier that can uniquely identify button data such as an UUID (Universal Unique ID). The search for button data is performed in the data saved in the button data storage unit 508. The button data management unit 507 passes button data found as a result of search to the button data analyzing unit 506, and the processing proceeds to S1863. In the present embodiment, if it is assumed that the device that has received the acquisition request is the MFP 110, and the button ID appended to the acquisition request is 1, button data "Transmit to PC 100" that corresponds to ID 1 in the column 901 of FIG. 9 is found. In S1863, in response to an instruction from the button data analyzing unit 506, the communication unit 502 transmits the button data found in S1862 to the newly registered device from which the acquisition request was received. In S1864, the button data management unit 507 deletes the button data saved in the button data storage unit 508. The button data deleted here is the button data that was transmitted to the newly registered device in S1863.

As described above, in Embodiment 2, when transferring button data, it is unnecessary for the client application 150 to acquire button data unlike Embodiment 1. The client application 150 only issues a transfer instruction, and button data can be transferred between devices.

Other Embodiments

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-035815, filed on Feb. 18, 2009, which is hereby incorporated by reference herein in its entirety.

What is claimed is:

1. An information processing apparatus that is connected to a plurality of image forming apparatuses with a network, the information processing apparatus comprising:
  at least a processor and a memory, cooperating to function as:
    a device information holder configured to hold device information that includes identifiers of image forming apparatuses that are currently registered to an application and were registered to the application in the past;
    a search unit configured to make a request with a user ID to the image forming apparatuses that correspond to the device information held by the device information holder, and to obtain operational settings information, for which access rights are granted to the user ID, from the image forming apparatuses that correspond to the device information held by the device information holder, wherein the operational settings information defines an operation of an image forming apparatus, and wherein the search unit does not make the request with the user ID to other image forming apparatuses that do not correspond to the device information held by the device information holder; and
    a registration request unit configured to issue a registration request to register the operational settings information obtained by the search unit to a new image forming apparatus that is newly registered to the application.

2. The information processing apparatus according to claim 1, further comprising a selector configured to control to display the operational settings information obtained by the search unit, and to select operational settings information from the displayed operational settings information based on a user's instruction,
  wherein the registration request unit issues the registration request to the new image forming apparatus so as to request the new image forming apparatus to register the operational settings information selected by the selector.

3. The information processing apparatus according to claim 2, wherein the registration request unit issues the registration request together with identification information regarding an image forming apparatus and the operational settings information selected by the selector, and
  wherein the new image forming apparatus that has received the registration request acquires the operational settings information from the image forming apparatus that corresponds to the identification information and registers the selected operational settings information as new operational settings information.

4. The information processing apparatus according to claim 2, wherein the selector controls to display the operational settings information obtained by the search unit in the form of a list and selects the operational settings information from the displayed list based on the user's instruction.

5. The information processing apparatus according to claim 1, wherein the search unit and the registration request unit execute each process in response to the registration of the new image forming apparatus to the application.

6. The information processing apparatus according to claim 1, further comprising:
an acquisition unit configured to acquire performance information regarding each of image forming apparatuses that correspond to the device information held by the device information holder, and
a selector configured to select one image forming apparatus based on the acquired performance information,
wherein the registration request unit issues the registration request to the new image forming apparatus so as to request the new image forming apparatus to register the operational settings information of the selected one image forming apparatus.

7. The information processing apparatus according to claim 1,
wherein a device function of the image forming apparatus registering the obtained operational settings information matches a device function of the new image forming apparatus.

8. The information processing apparatus according to claim 1, wherein the operational settings information is information of a single button that is associated with a plurality of functions and parameters, the button being displayed on a user interface of an image forming apparatus.

9. An information processing method performed by an information processing apparatus that includes a device information holder that holds device information that includes identifiers of image forming apparatuses that are currently registered to an application and were registered to the application in the past, and that is connected to a plurality of image forming apparatuses with a network, the information processing method comprising steps of:
making a request with a user ID to the image forming apparatuses that correspond to the device information held by the device information holder, wherein the request is not sent to other image forming apparatuses that do not correspond to the device information held by the device information holder;
obtaining operational settings information, for which access rights are granted to the user ID, from the image forming apparatuses corresponding to device information that is held by the device information holder, wherein the operational settings information defines an operation of an image forming apparatus; and
issuing a registration request to register the obtained operational settings information to a new image forming apparatus that is newly registered to the application.

10. A non-transitory computer-readable storage medium storing a program that causes a computer that is connected to a plurality of image forming apparatuses with a network to perform an information processing method using a device information holder that holds device information that includes identifiers of image forming apparatuses that are currently registered to an application and were registered to the application in the past, the information processing method comprising steps of:
making a request with a user ID to the image forming apparatuses that correspond to the device information held by the device information holder, wherein the request is not sent to other image forming apparatuses that do not correspond to the device information held by the device information holder;
obtaining operational settings information, for which access rights are granted to the user ID, from the image forming apparatuses corresponding to device information that is held by the device information holder, wherein the operational settings information defines an operation of an image forming apparatus; and
issuing a registration request to register the obtained operational settings information to a new image forming apparatus that is newly registered to the application.

* * * * *